US010049081B2

(12) United States Patent
Henkel

(10) Patent No.: US 10,049,081 B2
(45) Date of Patent: Aug. 14, 2018

(54) LOGBOOK WITH MULTIMEDIA FUNCTION

(71) Applicant: Airbus Operations GmbH, Hamburg (DE)

(72) Inventor: Wolfram Henkel, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 196 days.

(21) Appl. No.: 13/953,855

(22) Filed: Jul. 30, 2013

(65) Prior Publication Data

US 2014/0039717 A1 Feb. 6, 2014

Related U.S. Application Data

(60) Provisional application No. 61/677,519, filed on Jul. 31, 2012.

(30) Foreign Application Priority Data

Jul. 31, 2012 (DE) ........................ 10 2012 015 280

(51) Int. Cl.
*G06F 17/00* (2006.01)
*G06Q 10/00* (2012.01)
(Continued)

(52) U.S. Cl.
CPC ............ *G06F 17/00* (2013.01); *G06Q 10/00* (2013.01); *G06Q 50/30* (2013.01); *G07C 5/0858* (2013.01);
(Continued)

(58) Field of Classification Search
CPC ........ G01M 17/00; G06F 19/00; G06F 17/00; G01B 11/14; B64F 5/00; B64D 11/00
(Continued)

(56) References Cited

U.S. PATENT DOCUMENTS 7,917,255 B1* 3/2011 Finley ............................... 701/9
2003/0032448 A1 2/2003 Bulthuis et al.
(Continued)

FOREIGN PATENT DOCUMENTS

DE 102009018772 4/2010
EP 2423108 8/2011
WO 2010122048 10/2010

OTHER PUBLICATIONS

Mobile fieldwork solution for the construction industry, Vilkko, T.; Kallonen, T.; Ikonen J.; 2008.
German Search Report, dated Jul. 31, 2012.

*Primary Examiner* — Yonel Beaulieu
*Assistant Examiner* — Martin A Weeks
(74) *Attorney, Agent, or Firm* — Greer, Burns & Crain, Ltd.

(57) ABSTRACT

A system for documenting the state of a component, for example a component present on board a transport device; the use of such a system in a transport device; a transport device having such a system; an associated method for documenting the state of a component; and a computer program for executing the method. The transport device may be an aircraft. The system comprises a central logbook equipment and at least one mobile recording device, the mobile recording device comprising a recording unit for recording items of multimedia information relating to the state of the component, and a transmitting unit for transmitting the recorded items of multimedia information to the central logbook equipment. The central logbook equipment is configured to generate a multimedia logbook entry on the basis of the transmitted items of multimedia information, and to store the generated multimedia logbook entry.

15 Claims, 2 Drawing Sheets

(51) Int. Cl.
*G06Q 50/30* (2012.01)
*G07C 5/08* (2006.01)
*G07C 5/00* (2006.01)

(52) U.S. Cl.
CPC ........... *G07C 5/008* (2013.01); *G07C 5/0866* (2013.01); *G07C 2205/02* (2013.01)

(58) Field of Classification Search
USPC ...................................................... 701/1, 24
See application file for complete search history.

(56) References Cited

U.S. PATENT DOCUMENTS

| | | | |
|---|---|---|---|
| 2003/0200015 A1* | 10/2003 | Pillar | 701/33 |
| 2005/0090940 A1* | 4/2005 | Pajakowski et al. | 701/1 |
| 2007/0112489 A1* | 5/2007 | Avery et al. | 701/35 |
| 2007/0255786 A1* | 11/2007 | Mock | G06Q 10/109 709/204 |
| 2011/0106333 A1* | 5/2011 | Scheider | H04L 12/66 701/1 |
| 2012/0053779 A1* | 3/2012 | Fischer | 701/29.6 |
| 2014/0032079 A1* | 1/2014 | Varma et al. | 701/101 |

* cited by examiner

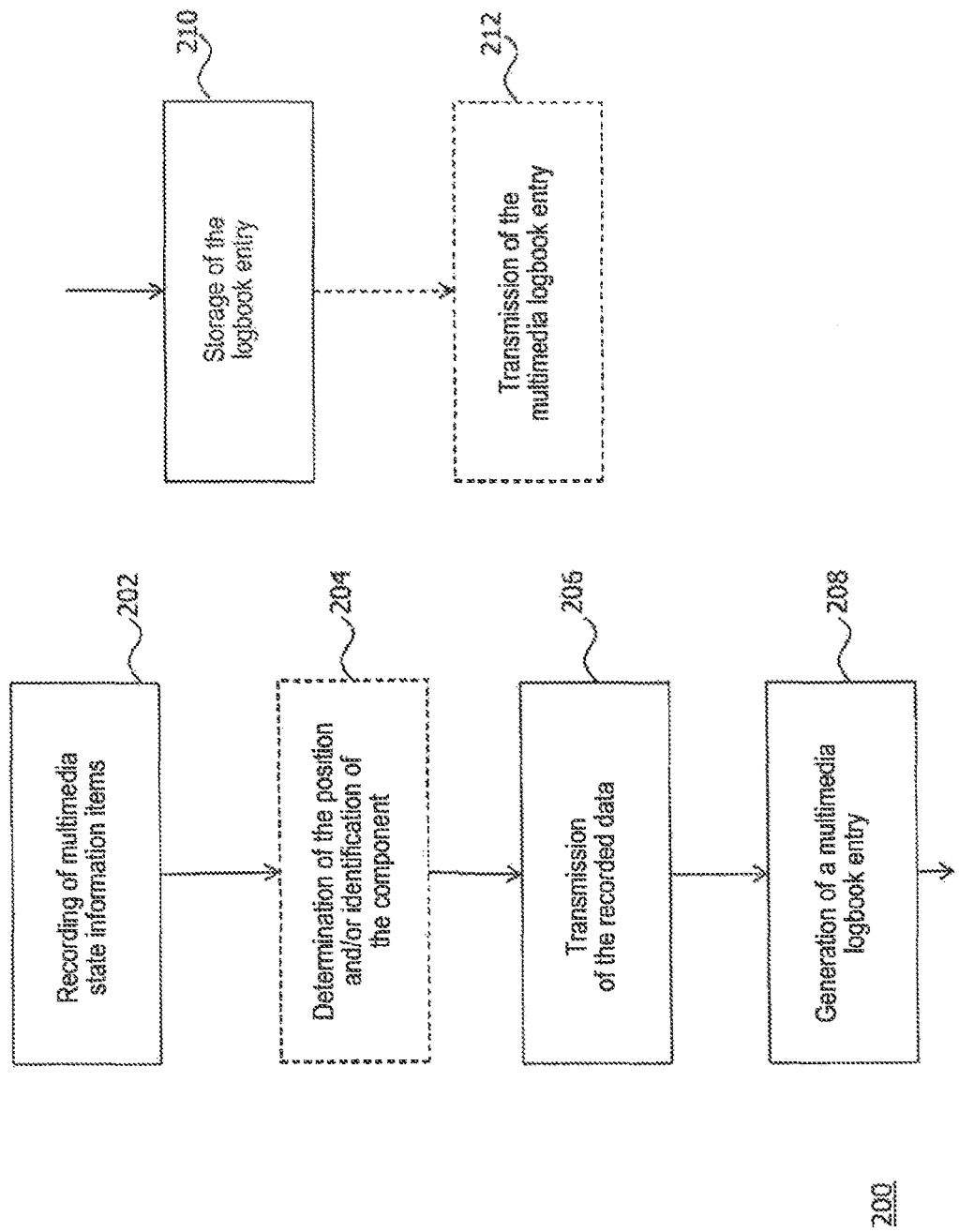

LOGBOOK WITH MULTIMEDIA FUNCTION

CROSS-REFERENCES TO RELATED APPLICATIONS

This application claims the benefit of the U.S. Provisional Application No. 61/677,519, filed on Jul. 31, 2012, and of the German patent application No. 10 2012 015 280.9 filed on Jul. 31, 2012, the entire disclosures of which are incorporated herein by way of reference.

BACKGROUND OF THE INVENTION

The present invention relates to: a system for documenting the state of a component, for example a component present on board a means of transport, such as an aircraft; the use of the system in a means of transport, for example in an aircraft; a means of transport, for example an aircraft, having such a system; an associated method for documenting the state of a component, for example a component present on board a means of transport, such as an aircraft; and a computer program for executing the method.

Disposed on means of transport, such as aircraft, buses, trains or ships, there are numerous components or structural parts whose state may change with time. The state of a component or structural part may change both in a wanted manner and in an unwanted manner. A wanted change of state can be understood to be, for example, that a luggage compartment present in a means of transport is deliberately brought from an open to a closed state. An unwanted change of state may be faults of a structural part, (technical) defects of a structural part, or damage to a structural part.

Usually, items of information relating to the state of structural parts, such as the occurrence of faults and defects, is recorded textually in logbooks. In conventional logbooks, fault messages can be generated in a predefined standard defect catalogue, by means of which a user can select predefined standard faults. Discrete faults can be recorded textually in an unambiguous manner by means of such a standard defect catalogue. A discrete fault is present, for example, if a lamp disposed in the means of transport fails to illuminate. This fault can be noted textually in an unambiguous manner in the logbook by, for example, the words "lamp does not illuminate."

The recording of a defect is normally followed by an in-situ inspection by the maintenance personnel, in order to assess the precise extent of the damage.

A method and a system for collecting defect data of structural parts in a passenger cabin of an aircraft are known from DE 10 2009 018 772 A1 and WO 2010/122048 A1. In the case of this method, an electronic device assigned to a user is connected to a central communication facility, a user interface provided by the communication facility is called up by the electronic device, defect data of components are requested by the communication facility, through an interactive dialog, via the user interface on the electronic device, and the requested defect data are stored in a central data storage unit by the communication facility.

EP 2 423 108 A2 and US 2012/0053779 A1 relate to a system and a method for collecting defect data of structural components in a passenger cabin of an aircraft. The system has a structural-part identification unit for identifying an affected structural part, and a malfunction selection equipment, connected to the structural-part identification equipment, for selecting a malfunction of the identified structural part from a predefined quantity of structural-part specific malfunctions. The system additionally has a locating equipment, connected to the structural-part identification equipment, for recording a position of the affected structural part in the passenger cabin.

US 2003/0032448 A1 describes a portable electronic device, by means of which real-time audio and/or real-time video signals and position-related items of information can be recorded.

SUMMARY OF THE INVENTION

It is an object of the present invention to provide a system and a method for documenting the state of a component, for example a component present on board a means of transport, the use of the system in a means of transport, a means of transport having such a system, and a computer program for executing the method, by means of which the state can be documented in a flexible and precise manner.

According to a first aspect, a system for documenting the state of a component is provided. The component may be, for example, a component present on board a means of transport, for example an aircraft. The system comprises a central logbook equipment and a mobile recording device. The mobile recording device has a recording unit and a transmitting unit. The recording unit of the mobile recording device is configured to record items of multimedia information relating to the state of a component, for example the component present on board the means of transport. The transmitting unit of the mobile recording device is configured to transmit the recorded items of multimedia information, relating to the state of the component, to the central logbook equipment. The central logbook equipment is configured to generate a multimedia logbook entry on the basis of the transmitted items of multimedia information, and to store the generated multimedia logbook entry. The state of the component can be documented by means of the multimedia logbook entry.

Multimedia may be understood to mean the combination composed of two or more differing media types, such as, for example, two or more differing types of digital media. Multimedia may also be understood to mean combined use of differing types of digital media, such that an addressee (recipient) can record the items of information via various channels (human sensory organs). The differing media types may be, for example, text information items, image information items, video information items and audio information items (sound information items), of which two or more, for example precisely two, precisely three or all various types can be optionally combined to form a multimedia content. Accordingly, the items of multimedia information can comprise two or more differing types of information. The two or more types of information items may be selected, for example, from the quantity of text information items, image information items, video information items and audio information items.

The central logbook equipment may be configured, for example, to store a multiplicity of multimedia logbook entries. Each of the multiplicity of multimedia logbook entries may be generated/have been generated in each case on the basis of a transmitted item of multimedia information. The transmitted items of multimedia information may originate from one or more differing components. Accordingly, the multimedia logbook entries may document the state of one or more differing components. The multimedia logbook entry can be generated, for example, in that two or more media types contained in the multimedia items of information are stored jointly. Accordingly, the multimedia logbook entry may be stored, addressed and called up through a memory address.

The mobile recording device may be any conceivable mobile device having a recording unit that is configured to record items of information relating to the state of components or structural parts such as, for example, relating to components or structural parts present or disposed on board a means of transport. It is conceivable for the mobile recording device to have a mobile telephone, a smartphone, a tablet computer, a laptop or the like, or to be realized as such a device. The recording unit can be configured to simultaneously record differing types of information items, such as, for example, video information items and audio information items. In addition or as an alternative to this, the recording unit can have two or more recording units, each of which can be used to record one or more than one item of state information. For example, a first recording unit may be configured as a text input unit for recording input text information items, a second recording unit may be configured as an image recording unit (e.g., as a camera) for recording image information items, a third recording unit may be configured as a sound recording unit (e.g., as a dictation device) for recording sound or audio information items, etc. Furthermore, video information items may be recorded by the second recording unit or by a fourth recording unit, configured as a video recording unit.

The component (which may also be referred to as a structural part) may be any type of inspectable component, concerning which it is possible to record items of information relating to its state. The items of information relating to the state may also be referred to, in short, as state information items, and they have been referred to thus in some cases in the following. For example, the component may be a component usually present or disposed on board a means of transport. Purely by way of example, non-electrical components, such as doors, seats, seat arm-rests, luggage compartments, etc., and electrical structural parts, such as lamps, loudspeakers, displays, etc. may be cited here. Accordingly, the state information items may be any type of information item relating to the state of a component. The state information items can describe or represent the state of the component by means of the two or more differing media types. The state of the component may also change in a wanted or unwanted manner. An unwanted change of state can be understood to mean, for example, a fault or defect, or damage to the component. Accordingly, the state information items can be items of information relating to faults, defects or damage of the component or structural part. Alternatively, however, they may also be items of information, relating to the state, or changes of state, of the component that do not ensue from faults, defects or damage. Purely by way of example, the position of a door may be cited here as a state. The state information items can specify, for example, whether a door is open or closed and/or to what extent a door is open.

A purely textual recording of states, such as faults and defects, is unambiguous only if there are discrete faults present. A non-illuminating lamp can be unambiguously described by means of the fault message "lamp does not illuminate." If the lamp fails to illuminate to full intensity, however, there is not a discrete fault present. In this case, it would only be possible to note textually that the illumination of the lamp is too weak, but not how weak the illumination is. With the use of multimedia state information items, by contrast, the weak illumination of a lamp can be represented with greater precision. For this purpose, it would be possible to combine, for example, text information items, such as "lamp illumination weak", with image information items that illustrate pictorially the weakness of the lamp illumination. This makes it easier to determine whether or not the lamp should then be replaced.

Other, non-discrete faults, such as instances of mechanical damage, abnormal noises or abnormal motional sequences, can also be recorded with greater precision by multimedia means than by text alone. By means of the multimedia state information items, the extent, precise location and the possible consequences of the non-discrete states, such as non-discrete faults, can be described with sufficient precision. In comparison with purely textual recording, multimedia recording can save time. In addition to a text entry and/or audio recording to describe a tear in a fabric covering of a seat, e.g., the size of the tear, the tear may also be quickly and easily photographed. The multimedia recording shows with greater precision where exactly the tear is located, and the size of the tear. Owing to the reduction in time expended, such defects can be identified more rapidly, and not only after time-consuming inspections or passenger complaints. Other instances of damage, such as a bent arm-rest on a particular seat (e.g., as a standardized textual fault message: "bent arm-rest at seat 15"), abnormal noises (e.g., as standardized textual fault message: "rattling noise in galley 1") or abnormal motional sequences (e.g., as standardized textual fault message: "very slow opening of hat rack") may also be recorded with greater precision by means of the multimedia state information items than through standardized text modules. Multimedia recording reduces the extent to which the state information items are affected by subjective perceptions and possible language difficulties. In addition, more precise description of a defect can often eliminate the need for in-situ inspection by the maintenance personnel. This reduces additional or unnecessary movements by the maintenance personnel, and the risk of delays to the means of transport, as well as cancellations/ and or rebooking of passengers.

According to a first possible realization of the system according to the first aspect, the transmitting unit may further be configured to transmit the recorded items of multimedia information to a control center, for example to a control center outside of the means of transport. For this purpose, the transmitting unit may transmit the items of multimedia information wirelessly, e.g., via WLAN, to a server disposed in the means of transport. From the server, the items of multimedia information may then be transmitted to the control center. As an alternative or in addition to this, it is conceivable for the mobile recording device to be connected to the server in a wire-bound manner, e.g., via a docking station, and for the transmitting unit to transmit the items of multimedia information to the server in a wire-bound manner. From the server, the items of multimedia information may be transmitted to the control center. In the control center, the transmitted items of multimedia information can be evaluated, and counter-measures initiated.

According to a second possible realization of the system according to the first aspect, which may be realized independently or in combination with the first possible realization, the central logbook equipment may be configured to transmit at least a part of the stored multimedia logbook entry, e.g., the entire multimedia logbook entry, to the control center, for example to the control center outside of the means of transport. The part of the stored multimedia logbook entry may be, for example, the items of multimedia information that have been recorded and transmitted by the mobile recording device to the central logbook equipment.

It is conceivable for the central logbook equipment to buffer the multimedia logbook entry for a short period, or to store it permanently. It is further conceivable for the multimedia logbook entry to be forwarded to the control center before or after storage. It is also conceivable that the stored multimedia logbook entry can be requested by the control center and, according to the request, transmitted from the logbook equipment to the control center. The transmission of the multimedia logbook entry from the central logbook equipment to the control center is not restricted to a particular method of transmission. If the means of transport is an aircraft, it is conceivable for the central logbook equipment to connect to a satellite and to transmit the multimedia logbook entry to the control center, e.g., located on the ground, via a satellite connection. Purely by way of example, the SATellite COMmunications (SATCOM) system or the Aircraft Communications Addressing and Reporting System (ACARS) System may be cited here as satellite systems suitable for the communication of data.

The mobile recording device may further comprise a locating unit for determining the position of the mobile recording device and/or for determining the position of the component. It is also conceivable, for example, for the mobile recording device to identify its own position (e.g., the position in the means of transport). The determination of position can also be effected, for example, by means of a position sensor, which is present in the recording device and whose position can be detected by satellite or other means. The locating unit may be used to determine the relative and/or absolute position of the recording device (e.g., in the means of transport). In addition or as an alternative to this, it is possible for the mobile recording device to be capable of determining the position of the component. Determination of the position of the component can be effected, for example, by means of a laser pointer or the like, e.g., provided on the recording device. The position of the component can then be inferred, for example, from the position of the recording device, in that the transit time of the laser beam emitted by the laser pointer is taken into account. In respect of the locating unit, reference is made to the application EP 2 423 108 A2 of the applicant, the content of which is hereby included in this application by reference.

Items of information relating to the determined position of the recording device and/or the component may be transmitted independently, or in combination with the items of multimedia information relating to the state of the component, from the transmitting unit to the control center and/or to the central logbook equipment. It is conceivable, for example, for the items of information relating to the determined position of the recording device and/or the component to be integrated into the recorded multimedia state information items, or to be combined with the latter, and then transmitted jointly to the control center and/or to the central logbook equipment. The central logbook equipment may thereby use this combined information to generate the multimedia logbook entry. As a result, the multimedia logbook entry can be used to store the position at which the state information items were recorded or the location of the recorded state, e.g., the location of a fault or defect. Alternatively, the items of information relating to the determined position of the recording device and/or the component may be transmitted separately from the multimedia state information items to the control center and/or the central logbook equipment. From the separately transmitted items of information, the central logbook equipment may then generate and store the multimedia logbook entry.

The mobile recording device may further comprise an identification unit for identifying the component. The identification unit can be configured, for example, to read out a code identifying the component and to identify the component on the basis of the read-out code. The code can be disposed, for example, on the component, or connected to the latter. The code can be, for example, a bar code. It is also conceivable for the code to be stored in a transponder that can be read out by means of an RFID read device (RFID: Radio-Frequency Identification; identification by means of electromagnetic waves). In addition or as an alternative to this, the identification unit can be configured to identify the component by means of imaging methods. In respect of the identification unit, reference is made to the application EP 2 423 108 A2 of the applicant (in particular, to the structural-part identification unit therein), the content of which is hereby included in this application by reference.

Items of information relating to the identified component may be transmitted independently, or in combination with the items of information relating to the state of the component, from the transmitting unit to the control center and/or to the central logbook equipment. It is conceivable, for example, for the items of information relating to the identified component to be integrated into the recorded multimedia state information items, or to be combined with the latter, and then transmitted jointly from the recording device to the control center and/or to the central logbook equipment. The central logbook equipment can thereby use this combined information to generate the multimedia logbook entry. As a result, the multimedia logbook entry can be used to record the component at which the state information items were recorded, e.g., the component, or component type, at which a fault or defect is present. The identification of a defective component additionally simplifies and accelerates the ordering of replacement parts for the defective component, or for replacement of the defective component. Alternatively, the items of information relating to the identified component may be transmitted separately from the multimedia state information items to the control center and/or the central logbook equipment. From the separately transmitted items of information, the central logbook equipment may then generate and store the multimedia logbook entry.

In summary, a logbook entry may be generated in the central logbook equipment for each recorded component. The recorded items of multimedia information relating to the state of the components may be stored in the logbook entry. In addition, the determined position information items such as, for example, the position of the component or the position of the recording device during the recording operation, may be stored in the logbook entry. In addition or as an alternative to the position information items, the identification information items determined in respect of the component, such as, for example, the type of component, may be stored in the logbook entry. The state information items stored in the logbook equipment, or the entire logbook entry stored in the logbook equipment, can be transmitted to the control center. The logbook entry can additionally be provided with items of information relating to the person (author) responsible for recording the state information items. These items of information may comprise the name of the author and contact data, which are added as items of contact information, for example behind or in the logbook entry.

According to a second aspect, the use of the system, as described herein, is provided in a means of transport, for example in an aircraft.

According to a third aspect, a means of transport, for example an aircraft, is provided with the system as described herein.

According to a fourth aspect, a method for documenting the state of a component is provided. The component may be, for example, a component present on board a means of transport, for example an aircraft. The method comprises the following steps: recording of items of multimedia information relating to the state of a component, for example of the component present on board the means of transport, by means of a mobile recording device; transmission of the recorded items of multimedia information, relating to the state of the component, to a central logbook equipment, by means of the mobile recording device; generation of a multimedia logbook entry on the basis of the transmitted items of multimedia information, by means of the central logbook equipment; and storage of the generated multimedia logbook entry in the central logbook equipment.

The method may further comprise the transmission of the recorded items of multimedia information to a control center, for example to a control center outside of the means of transport, by means of the mobile recording device. In addition or as an alternative to this, the method may further comprise the transmission of at least a part of the stored multimedia logbook entry to the control center, for example to the control center outside of the means of transport, by means of the central logbook equipment.

The method may further comprise the determination of the position of the mobile recording device. In addition or as an alternative to this, the method may comprise the determination of the position of the component.

The position of the recording device and/or of the component can be determined, for example, upon recording or during recording of the items of multimedia information relating to the state of the component. It is conceivable for the position to be determined automatically at the moment in which the recording operation is started or performed. In this way, it is possible to determine the location of the recording device and/or the component, and consequently, for example, the location of the fault, defect or damage. This further increases the accuracy of the recording of the state.

The method can further comprise the identification of the component. It is conceivable for the component to be determined automatically at the moment in which the recording operation is started or performed. In this way, the component, and consequently, for example, the precise location of the fault, defect or damage, is identified. This further increases the accuracy of the recording of the state.

According to a fifth aspect, a computer program comprising program code means is provided, which computer program, when loaded into a computer or a processor (for example, a microprocessor, microcontroller or digital signal processor (DSP)), or when running on a computer or processor (e.g., microprocessor, microcontroller or DSP), causes the computer or processor (e.g., the microprocessor, microcontroller or DSP) to execute one or more steps, or all steps, of the previously described aspects or of the previously described method. Additionally provided is a program storage medium or a computer program product having the said computer program.

Even if some of the aspects described above have been described in relation to the system or the means of transport, these aspects can also be implemented as a method or as a computer program executing the method. Even if the components to be examined have mostly been described, exemplarily, in relation to components present in a means of transport, such as an aircraft, the aspects described herein are not restricted to such components. The system, method and computer program, as described herein, are applicable in a multiplicity of other fields such as, for example, in the construction trade, for documentation purposes in the military, in medicine and in tourism. In the construction trade, it is conceivable for construction acceptance procedures to be simplified by means of the system, method and/or computer program, or for hand-over reports to be generated. In the tourist trade, travel reports, for example, can be generated easily and rapidly. In the case of application in the field of medicine, it is conceivable for patient medical histories or patient examinations to be documented.

BRIEF DESCRIPTION OF THE DRAWINGS

Preferred embodiments of the present invention are explained in the following on the basis of the appended schematic figures, wherein:

FIG. 2 shows a flow diagram of a conceivable embodiment of a method executed in the system from FIG. 1.

DETAILED DESCRIPTION OF THE PREFERRED EMBODIMENTS

Figure 1:
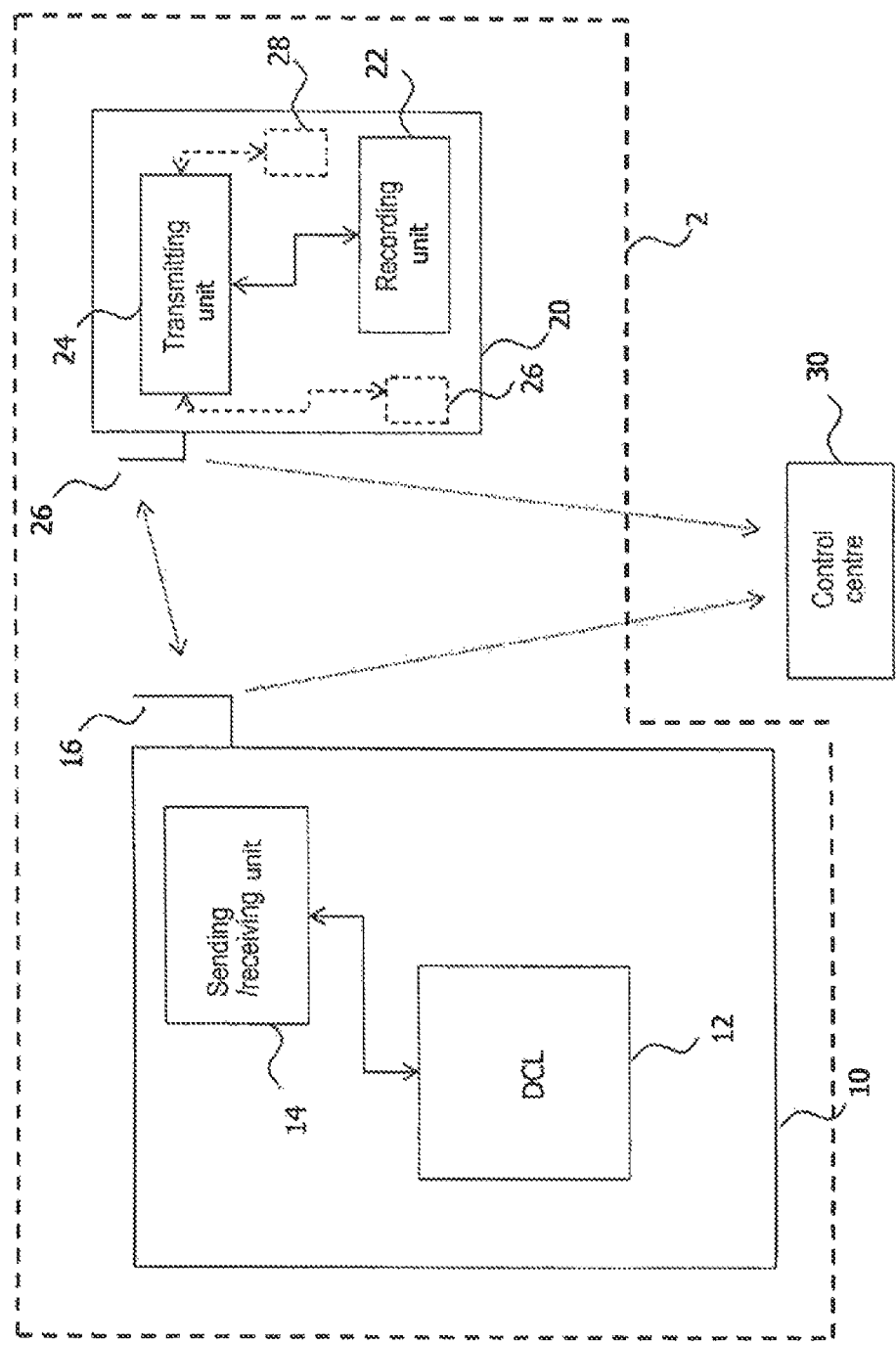
FIG. 1 shows a schematic representation of a conceivable embodiment of a system for documenting the state of a component.

In the following, but without limitation thereto, specific details are expounded in order to give a full understanding of the present invention. It is clear to persons skilled in the art, however, that the present invention can be used in other embodiments, which can differ from the details expounded in the following. The following details are described throughout in respect of a means of transport, but are not limited thereto and can also be applied in other fields such as in the construction trade, in medicine and in the tourist trade.

It is clear to persons skilled in that art that the explanations expounded in the following are/can be implemented through the use of hardware circuits, software means or a combination thereof. The software means can be associated with programmed microprocessors or a general computer, an ASCII (Application Specific Integrated Circuit) and/or DSPs (Digital Signal Processors). It is additionally clear that, even if the following details are described in respect of a method, these details can also be realized in an appropriate unit of equipment, a computer processor or a memory connected to a processor, the memory being provided with one or more programs that implement the method when they are executed by the processor.

In the following, the embodiments are mostly described, purely by way of example, in respect of an aircraft, as an example of a means of transport. Also in the following, it is mostly assumed, exemplarily, that the said components and units are those of such an aircraft. The components described in the following are not limited to use in an aircraft, however, but can also be disposed in other means of transport, such as trains, buses or ships.

FIG. 1 shows a conceivable embodiment of a system 2 for documenting the state of a component present in an aircraft. The system 2 comprises a central logbook equipment 10, and a mobile recording device 20. In the embodiment shown exemplarily in FIG. 1, the logbook equipment is realized, purely exemplarily, as an Electronic Logbook (ELB) 10. The ELB 10 comprises a Digital Cabin Logbook (DCL) 12, a sending/receiving unit 14 and an antenna 16 for receiving and sending data. The mobile recording device 20 comprises a recording unit 22, a transmitting unit 24 and an antenna 26 for receiving and sending data. Optionally, as indicated by the broken lines, the recording device 20 may also comprise a locating unit 26 and/or an identification unit 28. Also shown, finally, is a control center (Maintenance Control Center (MCC)) 30, which is located outside of the aircraft, on the ground.

The functioning of the system from FIG. 1 is now described in greater detail with reference to FIG. 2.

In step 202, items of multimedia information relating to the state of a component present or disposed on board an aircraft are recorded by means of the recording unit 22. In the following, the items of multimedia information relating to the state of the component are referred to in short as multimedia state information items or as multimedia state information items of the component. It is assumed in the following, purely by way of example, that the component is a luggage compartment that closes too slowly. The recording unit 22 is configured to record state information items of the component (e.g., the luggage compartment) that use two or more differing types of media. It is assumed, purely by way of example, that the recording unit 22 comprises an image recording unit for recording image information items, a video recording unit for recording video information items, an audio recording unit for recording audio information items (sound information items) and a text input unit for recording text information items. Not all of the said units need be present in the recording unit 22, however, but only one sub-group thereof may also be provided. In the exemplary case of the luggage compartment that closes too slowly, the video recording unit can be used to make video recordings that show the speed at which the luggage compartment closes. In addition, the audio recording unit can also be used to record a spoken text to describe the problem. In addition, the text input unit can also be used to input a text, for example to the effect that the luggage compartment closes too slowly.

Execution of the step 204 can be optional. As indicated by the broken lines, however, the step 204 may also be omitted. If the step 204 is executed, the locating unit 26 can be used to determine the position of the recording device 20 and/or the position of the component. The recorded position information items can be combined, for example, with the recorded state information items. By means of the position information items, it is possible to store, as the recorded fault or defect, the position of the recording device 20, e.g., during the recording operation, and/or of the recorded component/the recorded state. In the case of the luggage compartment that closes too slowly, therefore, the position of the luggage compartment in the means of transport can be determined and stored. Alternatively or additionally, the identification unit 28 can be used to identify the component, in the optional step 204. This can be effected, for example, in that a code applied to the component is read out by the identification unit 28. The code can specify the type of the component (e.g., that it is a luggage compartment) and can further contain items of information from which the position of the component can be inferred (e.g., that the component is the luggage compartment over row 3B). The recorded identification items can be combined with the multimedia state information items. The identification information items make it possible, for example, for replacement parts for a defective component to be ordered in a timely manner.

The recorded data (multimedia state information items and, if appropriate, position information items and/or identification information items) are forwarded from the corresponding units 22, 26, 28 to the transmitting unit 24. There, the items of information can be processed and transmitted, either in combination or separately.

In step 206, the recorded data are transmitted, via the transmission unit 24, to the ELB 10, or, more precisely, to the sending/receiving unit 14 of the ELB 10. The recorded data can be, for example, only the recorded multimedia state information items. If position information items and/or identification information items were also determined in step 204, these can be transmitted to the ELB 10 independently of the multimedia state information items or in combination with the state information items (step 206).

The data then arrive at the DCL 12. From the transmitted data, the ELB 10 can generate a multimedia logbook entry (step 208). If, for example, only the multimedia state information items are transmitted, the ELB 10 can generate the logbook entry on the basis of the multimedia state information items only. If position information items and/or identification information items are also transmitted in addition, the ELB 10 can generate the logbook entry on the basis of the multimedia state information items and the position information items and/or the identification information items. The generated multimedia logbook entry can then be stored in the ELB 10 (step 210) and, if appropriate, requested/read out.

As indicated by the broken lines in FIG. 2, execution of the step 212 can also be optional. In this step, the ELB 10, via the DCL 12 and the sending/receiving unit 14, can transmit to the MCC 30, disposed on the ground outside of the aircraft, at least a part of the stored logbook entry generated from the multimedia state information items and, if appropriate, position information items and/or identification information items. This transmission can be effected, for example, via a satellite connection to the ground, such as SATCOM or ACARS, when the aircraft is in the air. If the aircraft is on the ground, on the other hand, the data can be transmitted from the DCL 12 to the MCC 30 via, for example, a gatelink connection (i.e., a communication system, present on the aircraft, for aircraft communication with airport facilities) or the Global System for Mobile Communications (GSM) or other terrestrial mobile radio communications systems. The multimedia logbook entry transmitted to the MCC 30 can be, for example, the logbook entry generated on the basis of the multimedia state information items obtained from the mobile recording device 20. Additionally or alternatively, however, it can also be a logbook entry generated on the basis of multimedia state information items obtained from other recording devices. The position information items and/or identification information items of the recording device 20 can also be transmitted, in the logbook entry, to the MCC 30. The multimedia logbook entry can be transmitted, for example, by means of short messages (Short Message Service (SMS) or Multimedia Messaging Service (MMS)) from the recording device 20 to the MCC 30. Any conceivable method of wireless communication can be used for the transmission of data.

In addition or as an alternative to the transmission of the recorded data from the ELB 10 to the control center 30, the transmitting unit 24 can transmit the recorded state information items (and, if appropriate, the position information items and/or identification information items) directly to the control center 30, e.g., via a satellite connection (if the aircraft is in the air) or a terrestrial communication system (if the aircraft is on the ground), without a detour via the ELB 10.

The following sequences are conceivable, by means of the method represented in FIG. 2.

Before the passengers embark, a steward/stewardess goes through the cabin of the aircraft, with the mobile recording device 20 (mobile input device). Instances of damage, abnormal behavior or abnormal noises are recorded by means of the mobile recording device 20, e.g., by pressing of a button, and stored with a written or spoken text. The recorded data are synchronized with the aircraft system, such as the ELB 10, or, more precisely, the DCL 12. In addition, the recorded data are transmitted to the MCC 30. The recorded data are therefore available in the aircraft (in the DCL 12) and on the ground (in the MCC 30).

It is also conceivable for the steward/stewardess to go through the cabin with a trolley, in order to serve the passengers. The mobile recording device (mobile input device) 20 is located on the trolley. The passengers indicate instances of damage or problems, or these are identified during service. Instances of damage, abnormal behavior or abnormal noises are recorded e.g., by pressing of a button, and stored with a written or spoken text. The recorded data are synchronized with the aircraft system, such as the ELB 10, or, more precisely, the DCL 12. The data are transmitted to the MCC 30. The data are therefore available in the aircraft and on the ground.

Alternatively, it is equally conceivable that the faults be identified and recorded, not by the steward/stewardess, but by the maintenance personnel, service personnel, the pilot or co-pilots.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A system for documenting the state of a component, the component being a structural part present on board a means of transport, the system comprising:
    central logbook equipment comprising a receiving unit; and
    at least one mobile recording device, the mobile recording device comprising
        a recording unit for recording items of multimedia information relating to the state of the component, wherein the recording unit comprises at least one of a text input unit and a sound recording unit, and at least one of a camera and a video recording unit, and wherein the recorded items of multimedia information comprise at least a first digital media type including at least one of text information describing the state of the component recorded by the text input unit and audio information describing the state of the component recorded by the sound recording unit, and a second digital media type including at least one of image information illustrating the state of the component recorded by the camera and video information illustrating the state of the component recorded by the video recording unit, and
        a transmitting unit for transmitting the recorded items of multimedia information, relating to the state of the component, to the central logbook equipment;
    the central logbook equipment being a device different than the mobile recording device and being configured to receive, via the receiving unit, the transmitted items of multimedia information, to generate, using a processor, a digital multimedia logbook entry on the basis of the received items of multimedia information, and to store the generated multimedia logbook entry in a memory, wherein the digital multimedia logbook entry is generated in that at least the first and the second digital media types contained in the received items of multimedia information are stored jointly such that the digital multimedia logbook entry is stored, addressed, and retrievable through a memory address.

2. The system according to claim 1, wherein said means of transport comprises an aircraft.

3. The system according to claim 1, wherein at least one of the transmitting unit and the central logbook equipment is further configured to wirelessly transmit at least a part of the recorded items of multimedia information to a control center.

4. The system according to claim 3, wherein said control center is outside of the means of transport.

5. The system according to claim 1, wherein the mobile recording device further comprises a locating unit for at least one of determining the position of the mobile recording device and determining the position of the component, and wherein the generated digital multimedia logbook entry further comprises the determined position of the mobile recording device and the determined position of the component.

6. The system according to claim 1, wherein the mobile recording device comprises an identification unit for identifying the component, and wherein the generated digital multimedia logbook entry further comprises identification information.

7. The system according to claim 6, wherein the identification unit is at least one of configured to read out a code identifying the component and to identify the component on the basis of the read-out code, and configured to identify the code by means of imaging methods.

8. A method for documenting the state of a component, the component being a structural part present on board a means of transport, the method comprising:
    recording items of multimedia information relating to the state of the component, by means of a mobile recording device, wherein the recorded items of multimedia information comprise at least a first digital media type including at least one of text information describing the state of the component recorded by a text input unit of the mobile recording device and audio information describing the state of the component recorded by a sound recording unit of the mobile recording device, and a second digital media type including at least one of image information illustrating the state of the component recorded by a camera of the mobile recording device and video information illustrating the state of the component recorded by a video recording unit of the mobile recording device;
    transmitting the recorded items of multimedia information, relating to the state of the component, to central logbook equipment, the central logbook equipment being a device different than the mobile recording device;
    receiving the transmitted items of multimedia information by the central logbook equipment;
    generating, using a processor, a digital multimedia logbook entry on the basis of the received items of multimedia information, by means of the central logbook equipment; and
    storing the generated digital multimedia logbook entry in a memory of the central logbook equipment wherein the multimedia logbook entry is generated in that at least the first and second digital media types contained in the received items of multimedia information are stored jointly such that the digital multimedia logbook entry is stored, addressed, and retrievable through a memory address.

9. The method according to claim 8, the method further comprising at least one of the following steps:
wirelessly transmitting the recorded items of multimedia information to a control center by means of the mobile recording device; and
wirelessly transmitting at least a part of the stored multimedia logbook entry to a control center by means of the central logbook equipment.

10. The method according to claim 8, wherein the control center is located outside of the means of transport.

11. The method according to claim 8, wherein the means of transport comprises an aircraft.

12. The method according to claim 8, wherein the method further comprises at least one of determining a position of the mobile recording device and determining a position of the component, and wherein the generated digital multimedia logbook entry further comprises the determined position of the mobile recording device and the determined position of the component.

13. The method according to claim 12, wherein the step of determining the position of at least one of the recording device and the component occurs upon recording of the items of multimedia information relating to the state of the component.

14. The method according to claim 8, wherein the method further comprises identifying the component, and wherein the generated digital multimedia logbook entry further comprises identification information.

15. A non-transitory program storage medium having stored thereon, a computer program, comprising program code means, which, when loaded into a computer or processor, or when running on a computer or processor, causes the computer or processor to execute steps for documenting the state of a component, the component being a structural part present on board a means of transport, the steps comprising:
recording items of multimedia information relating to the state of the component, by means of a mobile recording device, wherein the recorded items of multimedia information comprise at least a first digital media type including at least one of text information describing the state of the component recorded by a text input unit of the mobile recording device and audio information describing the state of the component recorded by a sound recording unit of the mobile recording device, and a second digital media type including at least one of image information illustrating the state of the component recorded by a camera of the mobile recording device and video information illustrating the state of the component recorded by a video recording unit of the mobile recording device;
transmitting the recorded items of multimedia information, relating to the state of the component, to central logbook equipment, the central logbook equipment being a device different than the mobile recording device;
receiving the transmitted items of multimedia information by the central logbook equipment;
generating, using a processor, a digital multimedia logbook entry on the basis of the received items of multimedia information, by means of the central logbook equipment; and
storing the generated digital multimedia logbook entry in a memory of the central logbook equipment wherein the multimedia logbook entry is generated in that at least a first and second digital media types contained in the received items of multimedia information are stored jointly such that the digital multimedia logbook entry is stored, addressed, and retrievable through a memory address.

* * * * *